United States Patent
Kim et al.

(10) Patent No.: US 8,968,899 B2
(45) Date of Patent: Mar. 3, 2015

(54) SECONDARY BATTERY OF IMPROVED SEALABILITY

(71) Applicant: LG Chem, Ltd., Seoul (KR)

(72) Inventors: Hong Kue Kim, Cheongju-si (KR); Seung Tae Lee, Cheongwon-gun (KR); Eun Jung Lee, Cheongwon-gun (KR); Hak Kyun Kim, Cheongju-si (KR)

(73) Assignee: LG Chem, Ltd., Seoul (KR)

( * ) Notice: Subject to any disclaimer, the term of this patent is extended or adjusted under 35 U.S.C. 154(b) by 162 days.

(21) Appl. No.: 13/845,870

(22) Filed: Mar. 18, 2013

(65) Prior Publication Data
US 2013/0216876 A1 Aug. 22, 2013

Related U.S. Application Data

(63) Continuation of application No. PCT/KR2011/007434, filed on Oct. 7, 2011.

(30) Foreign Application Priority Data

Oct. 8, 2010 (KR) ........................ 10-2010-0098033

(51) Int. Cl.
*H01M 2/12* (2006.01)
*H01M 2/36* (2006.01)
*H01M 2/08* (2006.01)
*H01M 2/02* (2006.01)

(52) U.S. Cl.
CPC .............. *H01M 2/367* (2013.01); *H01M 2/361* (2013.01); *H01M 2/365* (2013.01); *H01M 2/08* (2013.01); *H01M 2/0217* (2013.01)
USPC .......................................................... 429/84

(58) Field of Classification Search
CPC ..... H01M 2/365; H01M 2/361; H01M 2/367; H01M 2/08; H01M 2/0217
See application file for complete search history.

(56) References Cited

U.S. PATENT DOCUMENTS 4,455,356 A * 6/1984 Barrett, Jr. ...................... 429/66
2005/0278941 A1* 12/2005 Hamada et al. .............. 29/623.1
2009/0038145 A1* 2/2009 Kozu et al. ................... 29/623.2

FOREIGN PATENT DOCUMENTS

EP   2141758 A1   1/2010
EP   2626926 A2   8/2013

(Continued)

OTHER PUBLICATIONS

International Search Report issued in PCT/KR2011/007434, mailed on Apr. 23, 2012.

*Primary Examiner* — Raymond Alejandro
(74) *Attorney, Agent, or Firm* — Birch, Stewart, Kolasch & Birch, LLP

(57) ABSTRACT

Disclosed herein is a secondary battery having an electrode assembly placed in a prismatic container, wherein an upper part of the inside of an electrolyte injection hole formed in a base plate mounted to an open upper end of the prismatic container is configured to have a chamfered structure in which the diameter of the electrolyte injection hole is gradually decreased downward, a lower part of the inside of the electrolyte injection hole is configured to have a non-chamfered structure, the chamfered structure is formed in an irregular shape to increase the length of an electrolyte leakage route along which an electrolyte leaks out of the secondary battery, and, when a sealing member is pressed into the electrolyte injection hole, the sealing member is deformed so as to correspond to an internal structure of the electrolyte injection hole such that the electrolyte injection hole is sealed by the sealing member.

16 Claims, 5 Drawing Sheets

(56) References Cited

FOREIGN PATENT DOCUMENTS

| JP | 11-135082 A | 5/1999 |
| JP | 11-154506 A | 6/1999 |
| JP | 2000-90891 A | 3/2000 |
| JP | 2003-197179 A | 7/2003 |
| KR | 10-2007-0114242 A | 11/2007 |
| WO | WO 2007/069820 A1 | 6/2007 |

* cited by examiner

SECONDARY BATTERY OF IMPROVED SEALABILITY

CROSS REFERENCE TO RELATED APPLICATIONS:

This application is a Continuation of PCT International Application No. PCT/KR2011/007434 filed on Oct. 7, 2011, which claims priority under 35 U.S.C. §119(a) to Patent Application No. 10-2010-0098033 filed in the Republic of Korea on Oct. 8, 2010, all of which are hereby expressly incorporated by reference into the present application.

TECHNICAL FIELD

The present invention relates to a secondary battery exhibiting improved sealability, and, more particularly, to a secondary battery having an electrode assembly placed in a prismatic container, wherein an upper part of the inside of an electrolyte injection hole formed in a base plate mounted to an open upper end of the prismatic container is configured to have a chamfered structure in which the diameter of the electrolyte injection hole is gradually decreased downward, a lower part of the inside of the electrolyte injection hole is configured to have a non-chamfered structure, the chamfered structure is formed in an irregular shape to increase the length of an electrolyte leakage route along which an electrolyte leaks out of the secondary battery, and, when a sealing member is pressed into the electrolyte injection hole, the sealing member is deformed so as to correspond to an internal structure of the electrolyte injection hole such that the electrolyte injection hole is sealed by the sealing member.

BACKGROUND ART

As mobile devices have been increasingly developed, and the demand for such mobile devices has increased, the demand for secondary batteries as an energy source for the mobile devices has also sharply increased. Based on external and internal structures thereof, the secondary batteries are generally classified into a cylindrical battery, a prismatic battery, and a pouch-shaped battery. As the mobile devices have been miniaturized, the prismatic battery and the pouch-shaped battery, which have a small width to length ratio, have attracted considerable attention recently.

The prismatic secondary battery is manufactured by placing an electrode assembly including cathodes, anodes, and separators in a prismatic battery case, fixing a base plate to the upper end of the battery case, for example, by welding, injecting electrolyte into the battery case through an electrolyte injection hole formed in the base plate, sealing the electrolyte injection hole with a metal ball, mounting a safety element and a protection circuit on the base plate, and sealing the battery case with a housing (an external case).

A plan view of a base plate mounted to the upper end of a battery case of a conventional prismatic secondary battery with a vertical sectional view taken along line A-A is shown in FIG. 1.

Referring to FIG. 1, a base plate 100 is provided at the middle thereof with an electrode terminal 101, which is connected to an electrode tab (for example, an anode tab) of an electrode assembly, such that the electrode terminal 101 protrudes from the base plate 100. The base plate 100 is provided at one side thereof with an electrolyte injection hole 102, through which an electrolyte is injected. Between the protruding electrode terminal 101 and the base plate 100 is disposed an insulating member 103 to electrically isolate the electrode terminal 101 from the base plate 200, which is connected to the other electrode tab (for example, a cathode tab) of the electrode assembly so as to serve as an electrode terminal.

The electrolyte injection hole 102, through which the electrolyte is injected, is formed generally in a quadrangular shape in vertical section as shown in FIG. 2. The electrolyte injection hole 102 is sealed with a sealing member 104, made of aluminum, having a diameter slightly greater than that of the electrolyte injection hole 102. Specifically, the sealing member 104 is located on the electrolyte injection hole 102, and then the sealing member 104 is pressed from above such that the sealing member 104 is plastically deformed to seal the electrolyte injection hole 102. Subsequently, the periphery of the plastically deformed sealing member 104 is laser welded, or a thin metal plate is placed over the plastically deformed sealing member 104 and is laser welded, to seal the electrolyte injection hole.

When the sealing member is plastically deformed and is inserted into the electrolyte injection hole, which is formed in a quadrangular shape in vertical section, to seal the electrolyte injection hole with the sealing member, however, opposite sides of the sealing member are pushed outward by the inside upper end of the electrolyte injection hole. As a result, a groove is formed on the sealing member. The groove negatively affects the sealing of the electrolyte injection hole by laser welding. Furthermore, inside cracks are continuously formed along the interface between the sealing member and the inside surface of the electrolyte injection hole due to formation of the groove with the result that sealability of the electrolyte injection hole is lowered.

Also, in a case in which the electrolyte injection hole is sealed using a metal ball as the sealing member as described above, an electrolyte may leak out of the battery cell.

In addition, welding is further carried out to provide higher sealing force with the result that a defect rate of batteries is increased and manufacturing costs of the batteries are also increased.

Consequently, there is a high necessity for a technology that is capable of fundamentally solving the above-mentioned problems.

DISCLOSURE

Technical Problem

Therefore, the present invention has been made to solve the above problems and other technical problems that have yet to be resolved.

Specifically, it is an object of the present invention to provide a secondary battery having an electrolyte injection hole of a specific structure, thereby reducing the number of manufacturing processes of the battery and lowering a defect rate of batteries.

Technical Solution

In accordance with one aspect of the present invention, the above and other objects can be accomplished by the provision of a secondary battery having an electrode assembly placed in a prismatic container, wherein an upper part of the inside of an electrolyte injection hole formed in a base plate mounted to an open upper end of the prismatic container is configured to have a chamfered structure in which the diameter of the electrolyte injection hole is gradually decreased downward, a lower part of the inside of the electrolyte injection hole is configured to have a non-chamfered structure, the chamfered structure is formed in an irregular shape to increase the length of an electrolyte leakage route along which an electrolyte leaks out of the secondary battery, and, when a sealing member is pressed into the electrolyte injection hole, the sealing member is deformed so as to correspond to an internal structure of the electrolyte injection hole such that the electrolyte injection hole is sealed by the sealing member.

That is, the upper part of the inside of the electrolyte injection hole is configured to have the chamfered structure in which the diameter of the electrolyte injection hole is gradually decreased downward. When the sealing member is pressed into the electrolyte injection hole, therefore, the sealing member is easily plastically deformed. Consequently, it is possible to prevent a groove from being formed at the upper end of the pressed sealing member and to prevent cracks from being formed at the interface between the sealing member and the inside surface of the electrolyte injection hole.

Also, the chamfered structure is formed in an irregular shape to increase the length of the electrolyte leakage route along which an electrolyte leaks out of the secondary battery. Consequently, it is possible to greatly reduce leakage of the electrolyte out of the secondary battery.

Furthermore, when the sealing member is pressed into the electrolyte injection hole, the sealing member deformed into a shape corresponding to the electrolyte injection hole may come into tight contact with the chamfered structure due to shear stress between the chamfered structure and the sealing member and easily form a sealed state due to frictional interaction between the non-chamfered structure and the sealing member.

The irregular portion may be formed throughout the plane of the chamfered structure or partially formed at the plane of the chamfered structure. Also, the irregular portion may continuously or discontinuously extend along the plane of the chamfered structure.

Meanwhile, in a case in which the upper part of the inside of the electrolyte injection hole is configured to have the chamfered structure and the lower part of the inside of the electrolyte injection hole is configured to have the non-chamfered structure, it is possible to prevent the plastically deformed sealing member from being introduced into the lower part of the inside of the electrolyte injection hole and to exhibit higher sealing force, which is very preferable.

If the depth of the chamfered structure is too small, the volume of the plastically deformed sealing member is relatively increased with respect to a space of the chamfered structure with the result that a considerable portion of the sealing member may protrude from the top or the bottom of the base plate, which is not preferable. On the other hand, if the depth of the chamfered structure is too large, it may be difficult to seal the electrolyte injection hole, which is not preferable.

Consequently, the chamfered structure may extend downward from the upper end of the electrolyte injection hole within a range of 0.3×D to 0.7×D on the basis of a depth D of the electrolyte injection hole.

Also, it is preferable for the upper end width of the chamfered structure to be greater than the sealing member such that the sealing member is easily pressed into the electrolyte injection hole to effectively seal the electrolyte injection hole without welding. Specifically, an upper end width ($W_{top}$) of the chamfered structure may satisfy a condition of $1.0 \times R < W_{top} < 1.7 \times R$ on the basis of a diameter R of the sealing member, and a lower end width ($W_{bottom}$) of the chamfered structure may satisfy a condition of $0.5 \times R \leq W_{bottom} \leq 0.9 \times R$ on the basis of the diameter R of the sealing member.

A width W of the non-chamfered structure may be equal to the lower end width $W_{bottom}$ of the chamfered structure to prevent the plastically deformed sealing member from being introduced into the lower part of the electrolyte injection hole.

Preferably, the difference between the upper end width $W_{top}$ and the lower end width $W_{bottom}$ of the chamfered structure satisfies a condition of 8% to 42% the upper end width $W_{top}$.

For example, if the difference between the upper end width $W_{top}$ and the lower end width $W_{bottom}$ of the chamfered structure exceeds 0.5 mm, the electrolyte injection hole may be frequently deformed with the result that airtightness of the lower part of the electrolyte injection hole may be lowered. For this reason, the difference between the upper end width $W_{top}$ and the lower end width $W_{bottom}$ of the chamfered structure is preferably 0.1 to 0.5 mm.

Meanwhile, the difference between the diameter R of the sealing member and the lower end width $W_{bottom}$ of the chamfered structure may satisfy a condition of 8% to 25% the diameter R of the sealing member.

For example, if the difference between the diameter R of the sealing member and the lower end width $W_{bottom}$ of the chamfered structure exceeds 0.3 mm, the electrolyte injection hole may be frequently deformed with the result that airtightness of the lower part of the electrolyte injection hole may be lowered. For this reason, the difference between the diameter R of the sealing member and the lower end width $W_{bottom}$ of the chamfered structure is preferably 0.1 to 0.3 mm.

In a preferred example, an inclination angle of the chamfered structure may be 30 to 70 degrees, preferably 30 to 64 degrees, to the top of the base plate.

As in the previous description, if the inclination angle of the chamfered structure is too steep, the relatively large sealing member may protrude from the top or the bottom of the base plate, which is not preferable. On the other hand, if the inclination angle of the chamfered structure is too gentle, sealability of the electrolyte injection hole may be lowered or cracks may be formed at the sealing member, which is not preferable.

Consequently, the depth, the width, and the inclination angle of the chamfered structure may be appropriately decided depending upon the sizes of the electrolyte injection hole and the base plate. The sealing member may be partially deformed as needed as long as the sealing member is plastically deformed to easily seal the electrolyte injection hole.

The irregular shape may be formed by protrusions arranged at intervals of 1 to 50 μm.

In a preferred example, the sealing member may be formed in a spherical shape, and the electrolyte injection hole may be formed in a circular shape in horizontal section.

That is, the sealing member, when pressed, is plastically deformed to seal the electrolyte injection hole. Preferably, the sealing member is a metal ball.

Meanwhile, the sealing member may be pressed in a state in which the sealing member is located on the electrolyte injection hole, and the sealing member may be prevented from falling into the electrolyte injection hole by the chamfered structure to increase the contact area between the sealing member and the electrolyte injection hole.

Also, a polymer resin, such as an epoxy resin, may be applied to the periphery of the electrolyte injection hole to hermetically seal the periphery of the electrolyte injection hole in a state in which the electrolyte injection hole is sealed after the sealing member is pressed.

In accordance with another aspect of the present invention, there is provided a secondary battery manufacturing method. Specifically, the secondary battery manufacturing method includes (a) placing an electrode assembly in a prismatic container, (b) mounting a base plate having an electrolyte injection hole, an upper part of the inside of which is configured to have a chamfered structure in which the diameter of the electrolyte injection hole is gradually decreased downward, an irregular portion being formed at the chamfered structure, and a lower part of the inside of which is configured to have a non-chamfered structure, to an open upper end of the prismatic container, (c) injecting an electrolyte into the prismatic container through the electrolyte injection hole, and (d) pressing a sealing member in a state in which the sealing member is located on the electrolyte injection hole to deform the sealing member so as to correspond to the internal structure of the electrolyte injection hole such that the electrolyte injection hole is sealed by the sealing member.

In the secondary battery manufacturing method according to the present invention, when the sealing member is pressed into the electrolyte injection hole, the sealing member is easily plastically deformed since the upper part of the inside of the electrolyte injection hole is configured to have a chamfered structure in which the diameter of the electrolyte injection hole is gradually decreased downward. Consequently, it is possible to prevent a groove from being formed at the upper end of the pressed sealing member and to prevent cracks from being formed at the interface between the metal ball and the inside surface of the electrolyte injection hole.

Also, the chamfered structure is formed in an irregular shape to increase the length of the electrolyte leakage route along which an electrolyte leaks out of the secondary battery. Consequently, it is possible to greatly reduce leakage of the electrolyte out of the secondary battery.

Preferably, the step (d) includes (d1) locating the sealing member on the electrolyte injection hole in a state in which the prismatic container is fixed by a die, (d2) moving a press downward while rotating the press to press the sealing member into the electrolyte injection hole, and (d3) plastically deforming the sealing member such that the electrolyte injection hole is sealed by the sealing member.

In the secondary battery manufacturing method according to the present invention, therefore, the press presses the sealing member while being rotated. Consequently, it is possible to prevent the electrolyte injection hole from being collapsed and deformed. In addition, the electrolyte injection hole is effectively sealed merely through the pressing process, and therefore, it is possible to reduce the number of manufacturing processes.

Preferably, the step (d) further includes repeatedly reciprocating the press in a vertical direction in a state in which the press is moved upward by a predetermined height to press the sealing member. The step of repeatedly reciprocating the press may be carried out between the step (d2) and the step (d3).

That is, the press may be repeatedly reciprocated in the vertical direction in a state in which the press is moved upward by a predetermined height to press the sealing member while being rotated such that the electrolyte injection hole is sealed. As compared with a conventional one-time direct downward pressing process, which is carried out at relatively high pressure, therefore, it is possible to minimize collapse and deformation of the electrolyte injection hole. In addition, it is possible to improve sealability of the electrolyte injection hole without additional welding.

DESCRIPTION OF DRAWINGS

The above and other objects, features and other advantages of the present invention will be more clearly understood from the following detailed description taken in conjunction with the accompanying drawings, in which.

BEST MODE

Now, preferred embodiments of the present invention will be described in detail with reference to the accompanying drawings. It should be noted, however, that the scope of the present invention is not limited by the illustrated embodiments.

Figure 1:
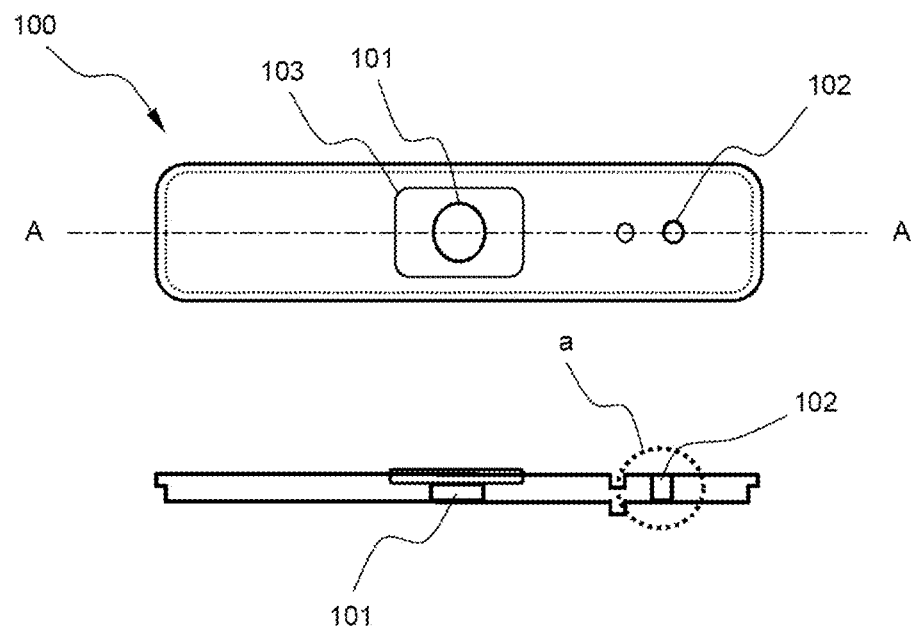
FIG. 1 is a plan view showing a base plate mounted to the upper end of a battery case of a conventional prismatic secondary battery with a vertical sectional view taken along line A-A.
Figure 2:
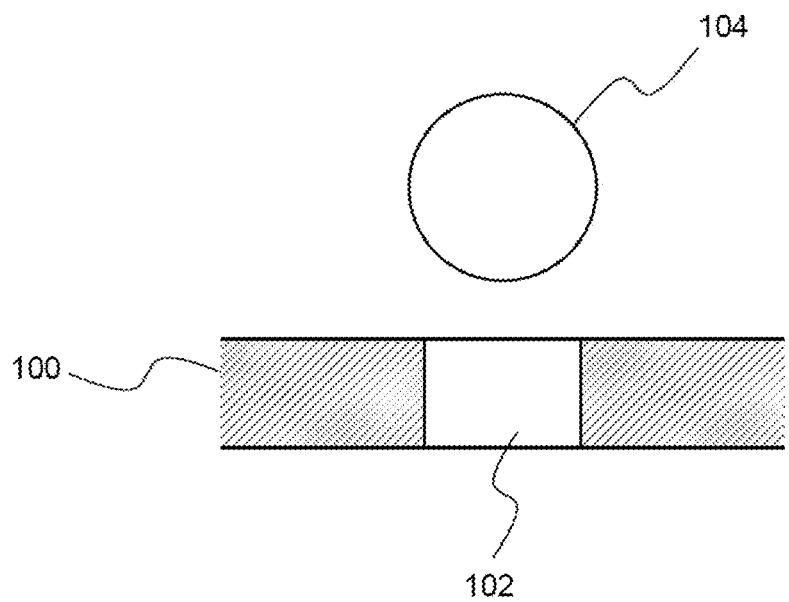
FIG. 2 is an enlarged view showing a dotted-line circle a of FIG. 1.
Figure 3:
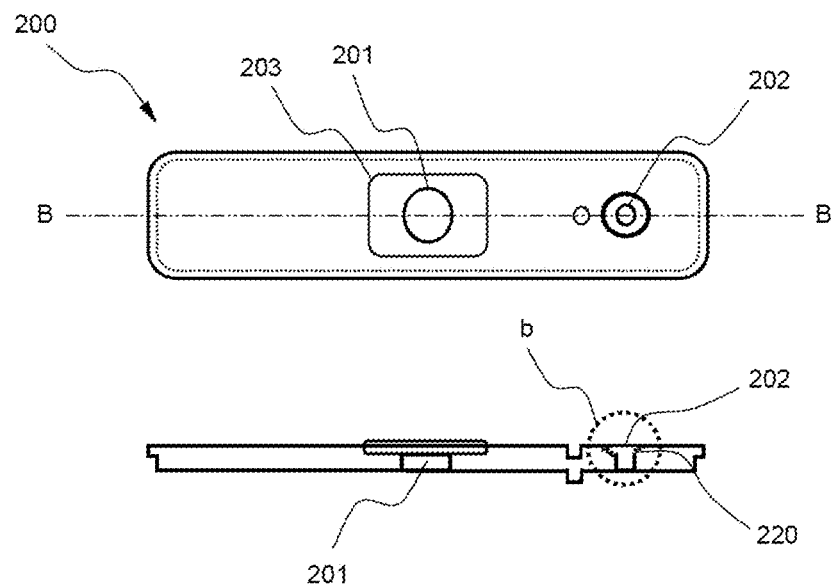
FIG. 3 is a plan view showing a base plate, having an electrolyte injection hole formed therein, of a prismatic secondary battery according to an embodiment of the present invention with a vertical sectional view taken along line B-B.
Figure 4:
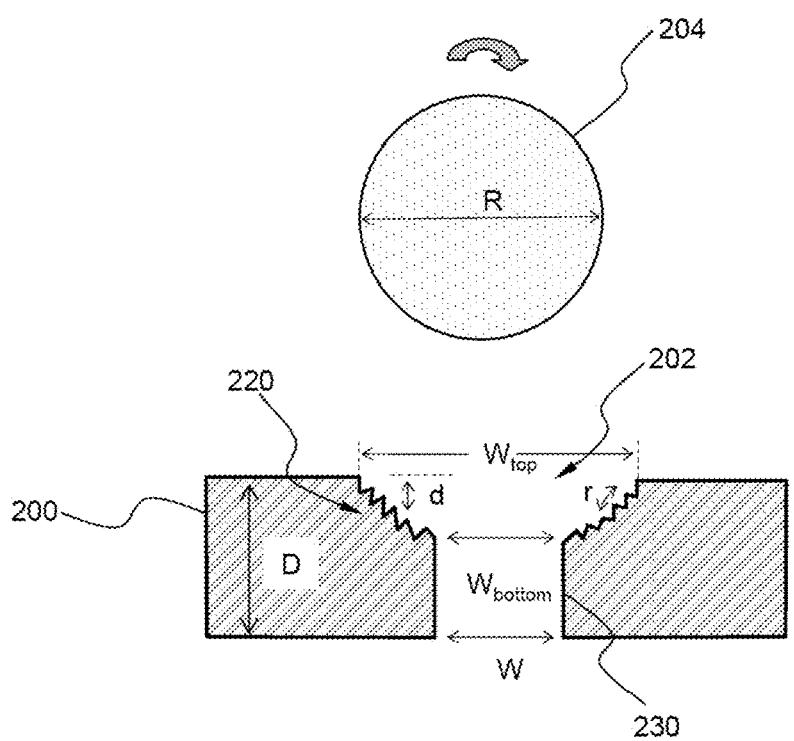
FIG. 4 is an enlarged view showing a dotted-line circle b of FIG. 3.

FIG. 3 is a plan view showing a base plate, having an electrolyte injection hole formed therein, of a prismatic secondary battery according to an embodiment of the present invention with a vertical sectional view taken along line B-B, and FIG. 4 is an enlarged view typically showing a dotted-line circle b of FIG. 3.

Referring to these drawings, a base plate 200 is provided at the middle thereof with an electrode terminal 201, which is connected to an anode tab of an electrode assembly (not shown), such that the electrode terminal 201 protrudes from the base plate 200. The base plate 200 is provided at one side thereof with an electrolyte injection hole 202. At the upper end of the base plate 200 adjacent to the electrolyte injection hole 202 is formed a groove, by which a protection circuit module is stably mounted to the base plate 200. Between the electrode terminal 201 and the base plate 200 is disposed an insulating member 203, which electrically isolates the electrode terminal 201 from the base plate 200, which is connected to a cathode tab of the electrode assembly.

The upper part of the inside of the electrolyte injection hole 202 of the base plate 200 is configured to have a chamfered structure 220 in which the diameter of the electrolyte injection hole 202 is gradually decreased downward. The lower part of the inside of the electrolyte injection hole 202 of the base plate 200 is configured to have a non-chamfered structure 230.

The chamfered structure 220 extends downward from the upper end of the electrolyte injection hole such that a depth d of the chamfered structure 220 is about 0.4 to 0.6 times a depth D of the electrolyte injection hole. An inclination angle r of the chamfered structure 220, which is an angle between chamfer extension lines, is about 45 degrees.

Also, an upper end width $W_{top}$ of the chamfered structure 220 is about 1.2 times a diameter R of a sealing member 204, and a lower end width $W_{bottom}$ of the chamfered structure 220 is about 0.7 times the diameter R of the sealing member 204. A width W of the non-chamfered structure 230 is equal to the lower end width $W_{bottom}$ of the chamfered structure 220.

A spherical sealing member 204, having a diameter greater than the upper end width $W_{top}$, is pressed into the electrolyte injection hole 202 by a rotary press to seal the electrolyte injection hole 202. The sealing member 204 may be a metal ball.

Figure 5:
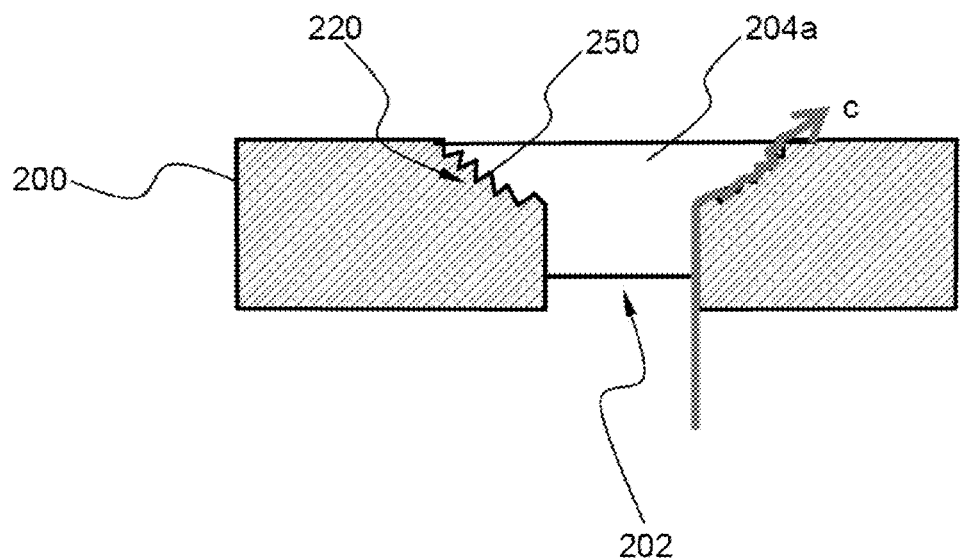
FIG. 5 is a typical view showing that a sealing member is pressed into the base plate of FIG. 4.
Figure 6:
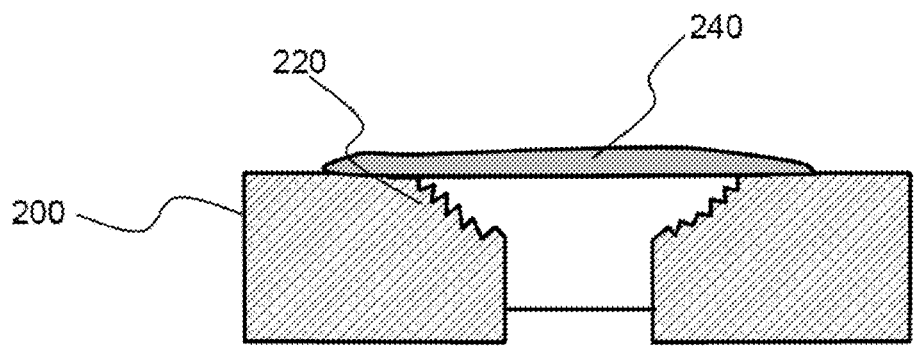
FIG. 6 is a typical view showing that an epoxy resin is applied to the sealing member of FIG. 5.

FIG. 5 is a typical view showing that a sealing member is pressed into the base plate of FIG. 4, and FIG. 6 is a typical view showing that an epoxy resin is applied to the sealing member of FIG. 5.

Referring first to FIG. 5, an irregular portion 250 is formed throughout the plane of the chamfered structure 220 such that the irregular portion 250 continuously extends along the plane of the chamfered structure 220 to increase the length of an electrolyte leakage route c along which an electrolyte leaks out of the secondary battery. The electrolyte injection hole 202 configured to have the above structure generally solves problems related to sealability and cracking of the sealing member.

Referring next to FIG. 6, an epoxy resin 240 is applied to the periphery of the electrolyte injection hole after the sealing member is pressed into the electrolyte injection hole.

Figure 7:
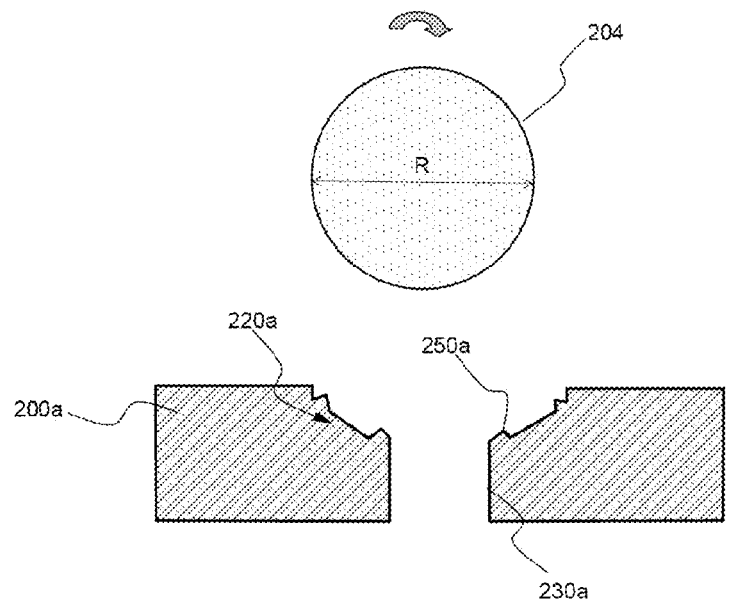
FIG. 7 is a vertical sectional view typically showing a base plate according to another embodiment of the present invention.

FIG. 7 is a vertical sectional view typically showing a base plate according to another embodiment of the present invention Referring to FIG. 7, the base plate is identical in structure to that of FIG. 5 except that an irregular portion 250a is partially formed at the plane of a chamfered structure 220a such that the irregular portion 250a discontinuously extends along the plane of the chamfered structure 220a, and therefore, a detailed description thereof will be omitted.

Figure 8:
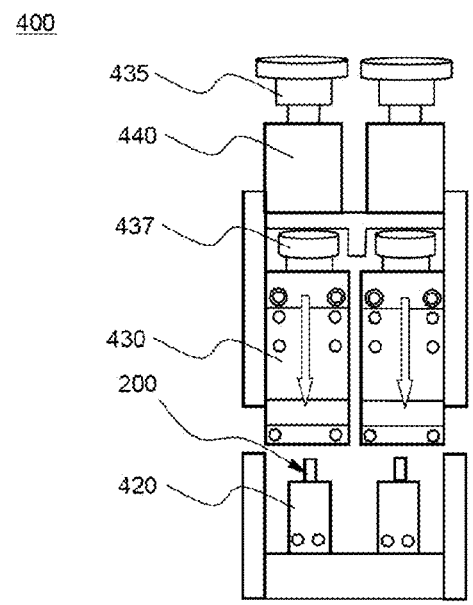
FIG. 8 is a typical view showing an apparatus for manufacturing a secondary battery according to another embodiment of the present invention.
Figure 9:
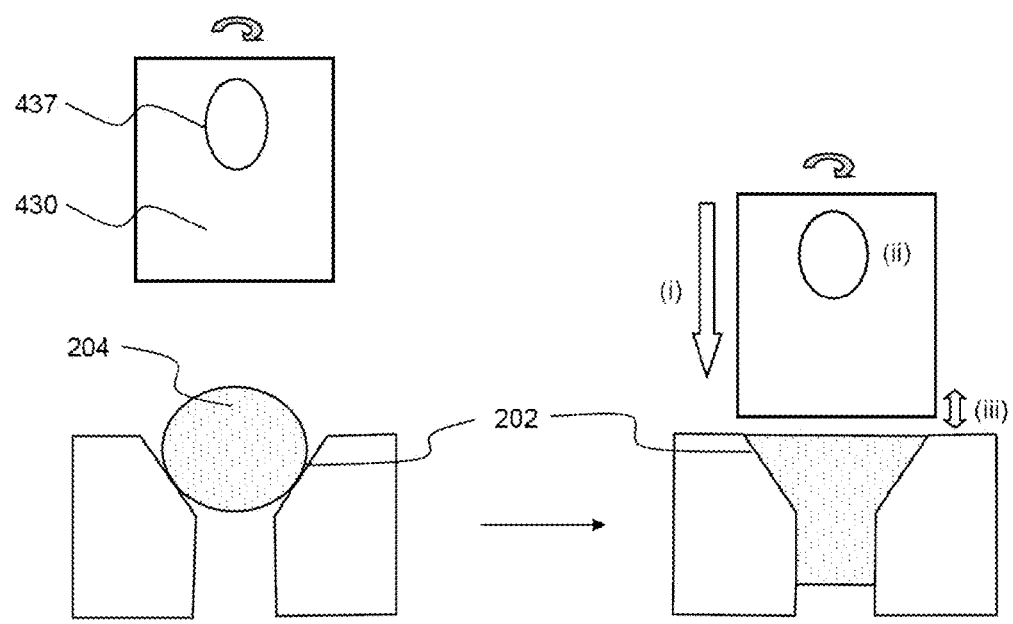
FIG. 9 is a typical view showing a process of pressing an electrolyte injection hole and a sealing member according to a further embodiment of the present invention.

FIG. 8 is a typical view showing an apparatus for manufacturing a secondary battery according to another embodiment of the present invention, and FIG. 9 is a typical view showing a process of pressing an electrolyte injection hole and a sealing member according to a further embodiment of the present invention.

Referring to these drawings together with FIG. 4, a secondary battery manufacturing apparatus 400 includes a die to fix a prismatic container (not shown) having an electrode assembly (not shown) mounted therein and a base plate 200 mounted to an open upper end thereof, a press 430 to perform vertical reciprocation (iii) above the die 420 and press the sealing member 204 during a downward movement (i) such that the sealing member 204 is pressed into the electrolyte injection hole 202 of the base plate 200, and a controller 440 to control the operation of the press 430.

The press 430 includes a cylinder 435 to perform the vertical reciprocation (iii) and a rotary motor 437 to rotate the press 430. When the press 430 performs the downward movement (i), therefore, the press 430 presses the sealing member 204 while performing rotation (ii) in a clockwise direction on the basis of the sealing member 204.

Also, the controller 440 controls the press 430 to press the sealing member 204 through about ten vertical reciprocations (iii) in a state in which the press 430 is moved upward by a height L of about 3 cm after the press 430 presses the sealing member 204 through one downward movement (i).

In this case, the press 430 presses the sealing member 204 at relatively low pressure, e.g. a pressure G of about 3 kgf, to secure airtightness and uniformity between the plastically deformed sealing member and the electrolyte injection hole.

That is, the press 430 performs the vertical reciprocations (iii) with respect to the sealing member 204 while being rotated (ii) in the clockwise direction by the rotary motor 437, thereby preventing the electrolyte injection hole from being collapsed and deformed. In addition, sealability of the electrolyte injection hole is improved, thereby securing airtightness of the battery.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

[Industrial Applicability]

As is apparent from the above description, a secondary battery according to the present invention includes a base plate having an electrolyte injection hole of a specific structure. Consequently, it is possible to reduce the number of manufacturing processes of the battery and to lower a defect rate of secondary batteries. Also, it is possible to greatly reduce leakage of an electrolyte out of the battery.

The invention claimed is:

1. A secondary battery having an electrode assembly placed in a prismatic container, wherein an upper part of an inside of an electrolyte injection hole formed in a base plate mounted to an open upper end of the prismatic container is configured to have a chamfered structure in which a diameter of the electrolyte injection hole is gradually decreased downward, a lower part of the inside of the electrolyte injection hole is configured to have a non-chamfered structure, the chamfered structure is formed in an irregular shape to increase a length of an electrolyte leakage route along which an electrolyte leaks out of the secondary battery, and, when a sealing member is pressed into the electrolyte injection hole, the sealing member is deformed so as to correspond to an internal structure of the electrolyte injection hole such that the electrolyte injection hole is sealed by the sealing member.

2. The secondary battery according to claim 1, wherein the chamfered structure extends downward from an upper end of the electrolyte injection hole within a range of 0.3×D to 0.7×D on the basis of a depth (D) of the electrolyte injection hole.

3. The secondary battery according to claim 1, wherein an upper end width ($W_{top}$) of the chamfered structure satisfies a condition of $1.0 \times R < W_{top} < 1.7 \times R$ on the basis of a diameter (R) of the sealing member.

4. The secondary battery according to claim 1, wherein a lower end width ($W_{bottom}$) of the chamfered structure satisfies a condition of $0.5 \times R \leq W_{bottom} \leq 0.9 \times R$ on the basis of a diameter (R) of the sealing member.

5. The secondary battery according to claim 1, wherein a width (W) of the non-chamfered structure is equal to a lower end width ($W_{bottom}$) of the chamfered structure.

6. The secondary battery according to claim 1, wherein a difference between an upper end width ($W_{top}$) and a lower end width ($W_{bottom}$) of the chamfered structure satisfies a condition of 8% to 42% the upper end width ($W_{top}$).

7. The secondary battery according to claim 1, wherein a difference between a diameter (R) of the sealing member and a lower end width ($W_{bottom}$) of the chamfered structure satisfies a condition of 8% to 25% the diameter (R) of the sealing member.

8. The secondary battery according to claim 1, wherein an inclination angle of the chamfered structure is 30 to 70 degrees to a top of the base plate.

9. The secondary battery according to claim 1, wherein the irregular shape is formed by protrusions arranged at intervals of 1 to 50 μm.

10. The secondary battery according to claim 1, wherein the sealing member is formed in a spherical shape, and the electrolyte injection hole is formed in a circular shape in horizontal section.

11. The secondary battery according to claim 1, wherein the sealing member is a metal ball.

12. The secondary battery according to claim 1, wherein the sealing member is pressed in a state in which the sealing member is located on the electrolyte injection hole, and the sealing member is prevented from falling into the electrolyte injection hole by the chamfered structure to increase contact area between the sealing member and the electrolyte injection hole.

13. The secondary battery according to claim 12, wherein an epoxy resin is applied to a periphery of the electrolyte injection hole after the sealing member is pressed into the electrolyte injection hole.

14. A manufacturing method of a secondary battery according to claim 1, the manufacturing method comprising:
 (a) placing an electrode assembly in a prismatic container;
 (b) mounting a base plate having an electrolyte injection hole, an upper part of an inside of which is configured to have a chamfered structure in which a diameter of the electrolyte injection hole is gradually decreased downward, an irregular portion being formed at the chamfered structure, and a lower part of the inside of which is configured to have a non-chamfered structure, to an open upper end of the prismatic container;
 (c) injecting an electrolyte into the prismatic container through the electrolyte injection hole; and
 (d) pressing a sealing member in a state in which the sealing member is located on the electrolyte injection hole to deform the sealing member so as to correspond to an internal structure of the electrolyte injection hole such that the electrolyte injection hole is sealed by the sealing member.

15. The manufacturing method according to claim 14, wherein the step (d) comprises:
 (d1) locating the sealing member on the electrolyte injection hole in a state in which the prismatic container is fixed by a die;
 (d2) moving a press downward while rotating the press to press the sealing member into the electrolyte injection hole; and
 (d3) plastically deforming the sealing member such that the electrolyte injection hole is sealed by the sealing member.

16. The manufacturing method according to claim 15, wherein the step (d) further comprises repeatedly reciprocating the press in a vertical direction in a state in which the press is moved upward by a predetermined height to press the sealing member, the step of repeatedly reciprocating the press being carried out between the step (d2) and the step (d3).

* * * * *